(12) United States Patent
Ganesan et al.

(10) Patent No.: US 8,154,138 B2
(45) Date of Patent: Apr. 10, 2012

(54) MUNICIPAL WASTEWATER ELECTRICAL POWER GENERATION ASSEMBLY AND A METHOD FOR GENERATING ELECTRICAL POWER

(76) Inventors: Subramaniam Ganesan, Rochester Hills, MI (US); Christopher J. Kobus, Rochester, MI (US); John Gerard Chupa, Farmington Hills, MI (US)

( * ) Notice: Subject to any disclaimer, the term of this patent is extended or adjusted under 35 U.S.C. 154(b) by 0 days.

(21) Appl. No.: 12/928,243

(22) Filed: Dec. 7, 2010

(65) Prior Publication Data

US 2011/0221207 A1  Sep. 15, 2011

Related U.S. Application Data

(63) Continuation of application No. 12/229,533, filed on Aug. 22, 2008, now Pat. No. 7,915,749.

(51) Int. Cl.
*F03B 13/00* (2006.01)
*F03B 13/10* (2006.01)
*H02P 9/04* (2006.01)
*C02F 3/00* (2006.01)
*C02F 1/00* (2006.01)
*B01D 37/00* (2006.01)
*B01D 3/10* (2006.01)
*B60H 1/02* (2006.01)
*F24D 1/04* (2006.01)

(52) U.S. Cl. ............ 290/43; 210/603; 210/770; 203/11; 237/12.1

(58) Field of Classification Search ............... 290/43; 203/11; 210/603, 770; 237/12.1
See application file for complete search history.

(56) References Cited

U.S. PATENT DOCUMENTS

| | | | | |
|---|---|---|---|---|
| 2,579,932 A * | 12/1951 | Kobernick | ............ | 237/12.1 |
| 3,589,313 A * | 6/1971 | Smith et al. | ............ | 110/222 |
| 3,670,669 A * | 6/1972 | Hoad | ............ | 110/220 |
| 3,741,890 A * | 6/1973 | Smith et al. | ............ | 210/667 |
| 3,827,946 A * | 8/1974 | Grimmett et al. | ............ | 203/11 |
| 4,010,098 A * | 3/1977 | Fassell | ............ | 210/609 |
| 4,157,961 A * | 6/1979 | Borst | ............ | 210/768 |
| 4,290,269 A * | 9/1981 | Hedstrom et al. | ............ | 60/670 |
| 4,291,636 A * | 9/1981 | Bergsten et al. | ............ | 110/346 |
| 4,316,774 A * | 2/1982 | Trusch | ............ | 203/11 |
| 4,321,151 A * | 3/1982 | McMullen | ............ | 210/769 |
| 4,454,427 A * | 6/1984 | Sosnowski et al. | ............ | 290/2 |
| 4,624,417 A * | 11/1986 | Gangi | ............ | 241/17 |
| 4,657,681 A * | 4/1987 | Hughes et al. | ............ | 44/589 |
| 4,733,528 A * | 3/1988 | Pinto | ............ | 60/39.12 |
| 4,750,454 A * | 6/1988 | Santina et al. | ............ | 123/3 |
| 4,762,527 A * | 8/1988 | Beshore et al. | ............ | 44/280 |
| 4,769,149 A * | 9/1988 | Nobilet et al. | ............ | 210/603 |
| 4,784,770 A * | 11/1988 | Nagao | ............ | 210/603 |
| 4,818,405 A * | 4/1989 | Vroom et al. | ............ | 210/603 |
| 4,880,533 A * | 11/1989 | Hondulas | ............ | 210/104 |
| 5,024,770 A * | 6/1991 | Boyd et al. | ............ | 210/747.7 |
| 5,032,289 A * | 7/1991 | Martineau | ............ | 210/747.6 |

(Continued)

FOREIGN PATENT DOCUMENTS

JP       05288324 A  * 11/1993

*Primary Examiner* — Pedro J Cuevas

(74) *Attorney, Agent, or Firm* — John G. Chupa

(57) ABSTRACT

An electrical generating assembly 10 which may be selectively used in combination with and/or as part of a municipal wastewater treatment facility 12 and which allows the wastewater treatment facility 12 to generate electrical energy 48, 62, 13 as received wastewater 14 is cleaned according to a plurality of diverse energy generating strategies.

4 Claims, 1 Drawing Sheet

U.S. PATENT DOCUMENTS

| | | | | |
|---|---|---|---|---|
| 5,279,637 A * | 1/1994 | Lynam et al. | | 71/12 |
| 5,428,906 A * | 7/1995 | Lynam et al. | | 34/379 |
| 5,445,088 A * | 8/1995 | Daugherty et al. | | 110/346 |
| 5,500,306 A * | 3/1996 | Hsu et al. | | 429/401 |
| 5,534,659 A * | 7/1996 | Springer et al. | | 588/311 |
| 5,556,232 A * | 9/1996 | Malmgren | | 405/129.2 |
| 5,557,873 A * | 9/1996 | Lynam et al. | | 34/379 |
| 6,216,463 B1 * | 4/2001 | Stewart | | 60/641.2 |
| 6,299,774 B1 * | 10/2001 | Ainsworth et al. | | 210/603 |
| 6,387,281 B2 * | 5/2002 | Millard et al. | | 210/764 |
| 6,444,124 B1 * | 9/2002 | Onyeche et al. | | 210/603 |
| 6,454,944 B1 * | 9/2002 | Raven | | 210/603 |
| 6,686,556 B2 * | 2/2004 | Mitchell | | 219/121.48 |
| 6,902,678 B2 * | 6/2005 | Tipton | | 210/669 |
| 7,105,088 B2 * | 9/2006 | Schien et al. | | 210/188 |
| 7,267,774 B2 * | 9/2007 | Peyton et al. | | 210/603 |
| 7,357,599 B2 * | 4/2008 | Cripps | | 405/75 |
| 7,387,723 B2 * | 6/2008 | Jordan | | 210/220 |
| 7,402,247 B2 * | 7/2008 | Sutton | | 210/603 |
| 7,452,160 B2 * | 11/2008 | Cripps | | 405/75 |
| 7,485,230 B2 * | 2/2009 | Magner et al. | | 210/603 |
| 7,491,336 B2 * | 2/2009 | Markham et al. | | 210/663 |
| 7,501,712 B2 * | 3/2009 | Bolyard | | 290/43 |
| 7,569,146 B2 * | 8/2009 | Peyton et al. | | 210/603 |
| 7,597,812 B2 * | 10/2009 | Schien et al. | | 210/770 |
| 7,632,040 B2 * | 12/2009 | Cripps | | 405/75 |
| 7,641,796 B2 * | 1/2010 | Stroot et al. | | 210/603 |
| 7,644,587 B2 * | 1/2010 | Yakobson et al. | | 60/780 |
| 7,718,064 B2 * | 5/2010 | Livingston et al. | | 210/603 |
| 7,727,395 B2 * | 6/2010 | Fitch et al. | | 210/603 |
| 7,736,510 B2 * | 6/2010 | Yoshida | | 210/603 |
| 7,736,511 B2 * | 6/2010 | Lugowski et al. | | 210/603 |
| 7,771,684 B2 * | 8/2010 | Constantz et al. | | 423/220 |
| 7,802,942 B2 * | 9/2010 | Cripps | | 405/75 |
| 7,915,749 B1 * | 3/2011 | Chupa et al. | | 290/43 |
| 8,002,499 B2 * | 8/2011 | Cripps | | 405/75 |
| 8,017,366 B1 * | 9/2011 | Schuh et al. | | 435/161 |
| 8,080,166 B2 * | 12/2011 | Spani | | 210/774 |
| 8,092,680 B2 * | 1/2012 | Johnson | | 210/603 |
| 2001/0023853 A1 * | 9/2001 | Millard et al. | | 210/764 |
| 2002/0114866 A1 * | 8/2002 | Kartchner | | 426/55 |
| 2002/0144981 A1 * | 10/2002 | Mitchell | | 219/121.44 |
| 2002/0148778 A1 * | 10/2002 | Raven | | 210/603 |
| 2003/0173291 A1 * | 9/2003 | Schimel | | 210/603 |
| 2005/0070751 A1 * | 3/2005 | Capote et al. | | 588/311 |
| 2006/0256645 A1 * | 11/2006 | Jensen et al. | | 366/131 |
| 2007/0041790 A1 * | 2/2007 | Cripps | | 405/75 |
| 2007/0082387 A1 * | 4/2007 | Felder et al. | | 435/168 |
| 2007/0212213 A1 * | 9/2007 | Bolyard | | 415/151 |
| 2008/0031691 A1 * | 2/2008 | Cripps | | 405/75 |
| 2008/0073266 A1 * | 3/2008 | McWhirter et al. | | 210/605 |
| 2008/0203014 A1 * | 8/2008 | Magner et al. | | 210/603 |
| 2008/0223046 A1 * | 9/2008 | Yakobson et al. | | 60/772 |
| 2008/0311640 A1 * | 12/2008 | Cox et al. | | 435/168 |
| 2009/0110485 A1 * | 4/2009 | Cripps | | 405/75 |
| 2009/0179427 A1 * | 7/2009 | Cripps | | 290/54 |
| 2009/0209025 A1 * | 8/2009 | Goschl et al. | | 435/262.5 |
| 2009/0249685 A1 * | 10/2009 | Flowers et al. | | 44/605 |
| 2009/0324458 A1 * | 12/2009 | Robinson et al. | | 422/187 |
| 2009/0324459 A1 * | 12/2009 | Robinson et al. | | 422/187 |
| 2009/0324460 A1 * | 12/2009 | Robinson et al. | | 422/187 |
| 2009/0324461 A1 * | 12/2009 | Robinson et al. | | 422/187 |
| 2009/0324462 A1 * | 12/2009 | Robinson et al. | | 422/187 |
| 2010/0040415 A1 * | 2/2010 | Cripps | | 405/75 |
| 2010/0043445 A1 * | 2/2010 | Coronella et al. | | 60/780 |
| 2010/0078307 A1 * | 4/2010 | Dale et al. | | 204/157.52 |
| 2011/0263407 A1 * | 10/2011 | Jew | | 494/6 |

* cited by examiner

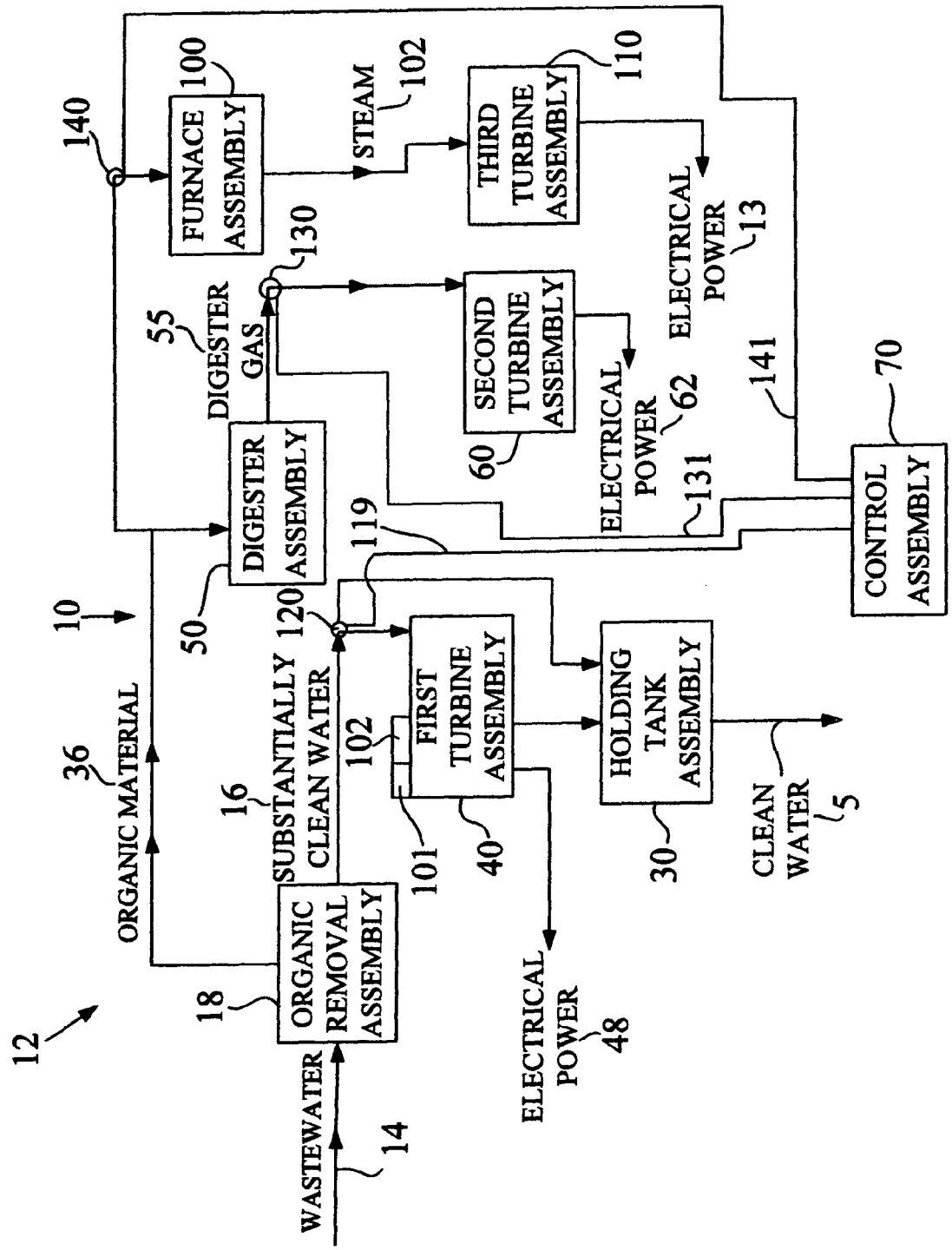

MUNICIPAL WASTEWATER ELECTRICAL POWER GENERATION ASSEMBLY AND A METHOD FOR GENERATING ELECTRICAL POWER

This application is a continuation nonprovisional application Ser. No. 12/229,533 and which was filed on Aug. 22, 2008 now U.S. Pat. No. 7,915,749.

GENERAL BACKGROUND

1. Field of the Invention

The present invention generally relates to a municipal wastewater electrical power generating assembly and to a method for generating electrical power and, more particularly, to an assembly and to a method which allows for the efficient generation of electrical power and electrical energy from a wastewater treatment facility according to a variety of generating strategies which may be selectively used in a desired manner.

2. Background of the Invention

A wastewater treatment facility typically receives waste laden water based liquid (generally and most typically denoted as "wastewater") and is adapted to and actually treats the contained waste by removing undesirable waste constituents from the received liquid (e.g., organic type constituents) and returns or generates or "creates" substantially "clean" water which may be further processed to create what is often referred to as "drinkable" Water. Typically, such a treatment facility is owned and operated by a municipality and the treated liquid which emanates from that municipality (i.e., the generated or produced "clean" water) is transmitted back to citizens or residents of that municipality.

While these wastewater treatment facilities do indeed desirably treat such waste liquid, they undesirably utilize a lot of electrical energy and the cost of such energy is increasing. Moreover the cost and use of such electrical energy for all purposes is vastly increasing throughout the world.

The present invention enhances the operational performance of such wastewater treatment facilities by allowing for the efficient generation of electrical power as part of the overall wastewater treatment process, wherein such generated electrical power may be used for a variety of purposes and in a variety of applications.

SUMMARY OF THE INVENTION

It is a first non-limiting object of the present invention to provide an assembly which may be used within a wastewater treatment facility and which allows for the generation of electrical power as part of the overall wastewater treatment process.

It is a second non-limiting object of the present invention to provide a method for generating electrical power as part of a wastewater treatment process.

It is a third non-limiting object of the present invention to provide an assembly and a method which is adapted to employ a plurality of diverse electrical energy generating strategies and to allow several or all or a selected singular strategy to be selectively employed.

According to a first non-limiting aspect of the present invention an assembly is provided for use in combination with a wastewater treatment facility of the type which receives waste containing liquid and which produces substantially clean water and waste, the assembly of the present invention including a first portion which selectively receives the substantially clean water and which selectively generates electricity by use of the received substantially clean water; a second portion which receives the waste and which selectively generates electricity by use of the received waste; and a third portion which controls the operation of the first and second portions, thereby controlling the generation of electricity by use of the waste containing liquid.

According to a second non-limiting aspect of the present invention, a method for generating electrical energy is provided. Particularly, the method includes receiving wastewater which comprises a combination of water and waste; removing the waste from the wastewater, thereby producing substantially clean water; causing the substantially clean water to flow through a first turbine assembly and to thereafter enter a retention pond, producing gas from the received waste; and using the gas to operate a second turbine assembly, wherein the first and second turbine assemblies are each adapted to selectively produce electrical energy.

According to a third non-limiting aspect of the present invention an assembly is provided for use in combination with a wastewater treatment facility of the type which receives waste containing liquid and which produces substantially clean water and waste, the assembly of the present invention including a first portion which selectively receives the substantially clean water and which selectively generates electricity by use of the substantially clean water; a second portion which receives the waste and which generates waste gas; a third portion which selectively receives the waste gas and which selectively generates electricity by use of the waste gas; a controller which is coupled to said first, second, and third portions and which controls the operation of the first, second, and third portions, thereby controlling the generation of electricity by use of the waste containing liquid.

According to a fourth non-limiting aspect of the present invention a method for generating electrical energy is provided. Particularly, the method comprises a plurality of electric energy generating strategies involving wastewater; and selectively utilizing the predetermined control strategies in a manner which allows a substantially constant amount of electric energy to be produced.

These and other aspects, features, and advantages of the present invention will become apparent from a reading of the detailed description of the preferred embodiment of the invention and by reference to the following drawings.

BRIEF DESCRIPTION OF THE DRAWINGS

FIG. 1 is a block diagram of the assembly and method for generating electrical power according to the teachings of the preferred embodiment of the invention.

DETAILED DESCRIPTION OF THE PREFERRED EMBODIMENT OF THE INVENTION

Referring now to FIG. 1, there is shown an electrical power generation assembly 10 which is made in accordance with the teachings of the preferred, although non-limiting, invention and which is operatively deployed within and which operates in combination with and/or which forms a part of an overall wastewater treatment facility 12, such as but not-limited to a municipal wastewater treatment facility.

Particularly, as should be known to those of ordinary skill in the art, the wastewater treatment facility 12 receives wastewater 14 and produces water 16 which has a reduced amount of organic material. This "cleaned" water 16 (i.e., sometimes referred to as "substantially clean water) is typically sent to a holding tank assembly 48 which may agitate the water and/or further process the water, before it is deemed to be "drinkable" or potable. The substantially "drinkable" water 5 is then transmitted and/or delivered to the various residents, citizens, and business/other entities which operate within that municipality. The combination of the organic removal assembly and the holding tank assembly 30 cooperatively form the wastewater treatment facility 12, according to one non-limiting embodiment.

The treatment system 12 includes an organic removal assembly 18 (such as an agitator assembly) which is adapted to receive the wastewater 14 and to selectively remove the organic material from the received wastewater 14, thereby creating substantially clean water 16. It should be appreciated that the present invention is independent of the actual organic material removal process and that substantially any desired organic removal process may be utilized, of which there may be many. Importantly, according to the known and utilized strategies, the substantially clean water 16 is transmitted, in one non-limiting embodiment, to holding tanks 30 while the removed organic material 36 is typically discarded.

According to the teachings of the present invention, the substantially clean water 16, on its way to the holding tanks or pond 30, is made to first traverse a first turbine assembly 40 and such traversal causes the generation of electrical energy or electrical power 48. That is, the turbine assembly 40 includes the combination of a turbine 101 and a generator 102 and the moving water 16 causes the blades of the turbine 101 to move, and such movement is transferred to the generator 102 which causes the generator to generate electricity or electrical power 48. The obtained organic material 36 is transmitted, in one non-limiting embodiment, to a digester assembly 50 (e.g., comprising in one non-limiting embodiment, a plurality of holding tanks) and the organic material subsequently produces digester gas 55. This digester gas 55 is then used to operate a second turbine assembly 60 which may be substantially similar to assembly 40 and which produces electrical power 62 (e.g., the produced gas is made to turn/move the blades of the turbine of this second assembly 40, which causes concomitant movement within a second generator which is effective to produce electricity or electrical power 62). Both of the turbine assemblies 40, 60 operate under the direction and control of controller assembly 70 and may each be selectively connected to the power grid of the municipality where the generated electrical power 48, 62 may be sold and utilized. Alternatively the produced electrical power 48, 62 may be utilized by the wastewater treatment plant itself.

Moreover, the organic material may alternatively be utilized/processed as fertilizer and the digester gas may be transmitted to a heat exchanger assembly and the produced heated air may be used within/outside of the plant 12.

Alternatively or concurrently with the foregoing operation of the turbine assemblies, 40, 60, some or all of the organic material 36 may be transmitted to a furnace assembly 100 where the received organic material 36 is combusted and made to produce steam 102. The steam 102 may then be selectively communicated to a third turbine assembly 110 (which may be substantially similar to assembly 40) and the gas 102 causes the blades of the turbine portion of the third turbine assembly 110 to move, which in turn causes the generator portion of the third turbine assembly 110 to generate electricity 13. Alternatively, the created gas 102 may be selectively communicated to the second turbine assembly 60 and/or to the first turbine assembly 40 which causes this turbine assembly 60 to produce electricity.

It should be appreciated that the foregoing electric power generator system 10 has three separate and unique power generator strategies (e.g., each strategy, in one non-limiting embodiment uses a unique turbine assembly 40, 60, 110) which may be singularly or cooperatively employed in any manner (e.g., each strategy may respectively and singularly be utilized, any two strategies may be utilized, or all three strategies may be utilized as desired).

It should further be appreciated that the control assembly 70 may comprise a computer which is operable under stored program control and is coupled to a first control valve 120, a second control valve 130, and a third control valve 140. Particularly, the control assembly 70 is coupled to valve 120 by bus 119 and by use of valve 120, assembly 70 allows the substantially clean water 16 to either flow through the first turbine assembly 40 or to bypass the assembly and enter into holding tank assembly 30. If no water 16 flows trough assembly 40, electrical power 48 is not produced. The control assembly 70 is coupled to valve 130 by bus 131 and by use of valve 130, assembly 70 either allows or prevents the emitted gas 55 to enter the turbine assembly 60. If no gas 55 flows through assembly 60, no electrical power 62 is produced. The control assembly 70 is coupled to valve 140 by bus 141 and by the use of control valve 140, assembly 70 either allows or prevents material 36 from entering the furnace or combustion chamber 100. If no material 36 enters furnace 100, no electrical power 13 is produced. In this manner, the selective activation of the control valves 120, 130, 140 allows for the use of the diverse strategies and such use is important because there may be an interruption or uneven supply in the substantially clean water 16, and/or there occurs a fault in one or more of the turbine assemblies 40, 60, 110, with such multiple strategies, electrical power, to some extent, may continue to be produced even if such a fault or interruption occurs. Moreover, the control assembly 70 may be programmed to provide a substantially constant amount of electric power. That is, in this production it is highly undesirable to have "spikes" (i.e., increases) or troughs (i.e., decreases) in the desired amount of electrical power production. The three strategies may be selectively employed by the controller assembly 70 to provide a substantially constant amount of electrical power. That is, controller assembly 70 constantly, in one non-limiting embodiment, monitors the amount of produced electrical power 48, 62, and 13 (by the use of a power meter assembly which is coupled to each of the turbine assemblies 40, 60, 110) and, through the control of valves, 120 130, 140, selects which strategies to use and the respective duration of use, in order to maintain an overall constant amount of generated electrical power. In yet a further non-limiting embodiment, heat which is exhausted from the furnace assembly 100 may be used/sold to heat homes or other buildings. In yet another non-limiting embodiment, a business method is provided whereby the electric power generation assembly 12 is provided to a municipality and operated by a private entity which provides some of the produced electrical power to that municipality and sells the rest, thereby comprising a profitable business venture.

It is to be understood that the present inventions are not limited to the scope or content of the subjoined claims but that various modifications may be made without departing from the spirit and the scope of the various inventions which are set forth in the following claims.

The invention claimed is:

1. A method for generating electrical energy from a wastewater treatment facility which receives water containing waste material, said method comprising the steps of placing a turbine within said wastewater treatment facility; separating said waste material from said water; causing said water, after said waste material has been removed, to be communicated to said turbine, effective to cause said turbine to generate electricity; and preventing said previously separated waste water from being combined with said water, thereby causing said previously separated waste material to remain separated from said water.

2. An energy generation assembly comprising a first turbine assembly which selectively generates electricity when said first turbine assembly receives water, a second turbine assembly which selectively generates electricity when said second turbine assembly receives steam; and a third turbine assembly which selectively generates electricity when said third turbine assembly receives digestive gas; an assembly which is coupled to said first, second, and third turbine assemblies; and a controller assembly which is coupled to said assembly and to said first, second, and third turbines and wherein said controller assembly selectively operates said assembly to cooperatively produce a predetermined and substantially constant amount of electricity by use of said first, second, and third turbine assemblies.

3. The energy generation assembly of claim 2 further comprising a first valve which is coupled to said first turbine assembly and to said controller assembly; a second valve which is coupled to said second turbine assembly and to said controller assembly; and a third valve which is coupled to said turbine assembly and to said controller assembly and wherein said first, second, and third valves are respectively coupled to water, steam, and digestive gas and wherein said controller selectively and controllably allows said first, second, and third valves to respectively communicate said water, steam, and digestive gas to said first, second, and third turbine assemblies only at respective certain periods of time, effective to cause said first, second, and third turbine assemblies to cooperatively produce said constant amount of electricity.

4. An improved wastewater treatment plant for the treatment of wastewater which comprises a combination of water and waste and having a wastewater treatment assembly which separates the water from the waste and a holding tank which receives the separated water, wherein the improvement comprising a turbine which receives the separated water from the wastewater treatment assembly, which utilizes said received separated water to produce electricity and which communicates said received separated water to said holding tank after said electricity has been produced.

* * * * *